United States Patent [19]

Veaux et al.

[11] Patent Number: 4,805,882
[45] Date of Patent: Feb. 21, 1989

[54] SHOCK ABSORBER WITH ADJUSTABLE RESIDUAL STROKE

[75] Inventors: Jacques Veaux, Chatillon; Michel Derrien, Versailles, both of France

[73] Assignee: Messier-Hispano-Bugatti, France

[21] Appl. No.: 66,166

[22] Filed: Jun. 25, 1987

[30] Foreign Application Priority Data

Jul. 7, 1986 [FR] France ............................. 86 09860

[51] Int. Cl.⁴ .................................................. F16F 9/22
[52] U.S. Cl. ............................. 267/64.25; 267/64.28; 267/64.13
[58] Field of Search ............... 267/64.15, 64.25, 64.28, 267/64.16, 126, 64.13; 188/269, 279, 299, 322.21, 314; 244/104 FP, 102 SS, 17.17, 102 R

[56] References Cited

U.S. PATENT DOCUMENTS

| 4,284,255 | 8/1981 | Masclet et al. | 244/102 R |
| 4,506,869 | 3/1985 | Masclet et al. | 267/64.15 |

FOREIGN PATENT DOCUMENTS 705634 5/1941 Fed. Rep. of Germany .
2057629 4/1981 United Kingdom .

Primary Examiner—Andres Kashnikow
Assistant Examiner—Mark T. Le
Attorney, Agent, or Firm—Gerald J. Ferguson, Jr.

[57] ABSTRACT

The present invention relates to shock absorbers including a rod slidable in a cylinder and a piston for determining at least two variable volume chambers, one of the two chambers including a first resilient member at a first pressure, and the other chamber containing a second resilient member at a second determined pressure, the second resilient member being suitable for being displaced in translation en bloc by an actuator chamber.

2 Claims, 7 Drawing Sheets

Fig: 6

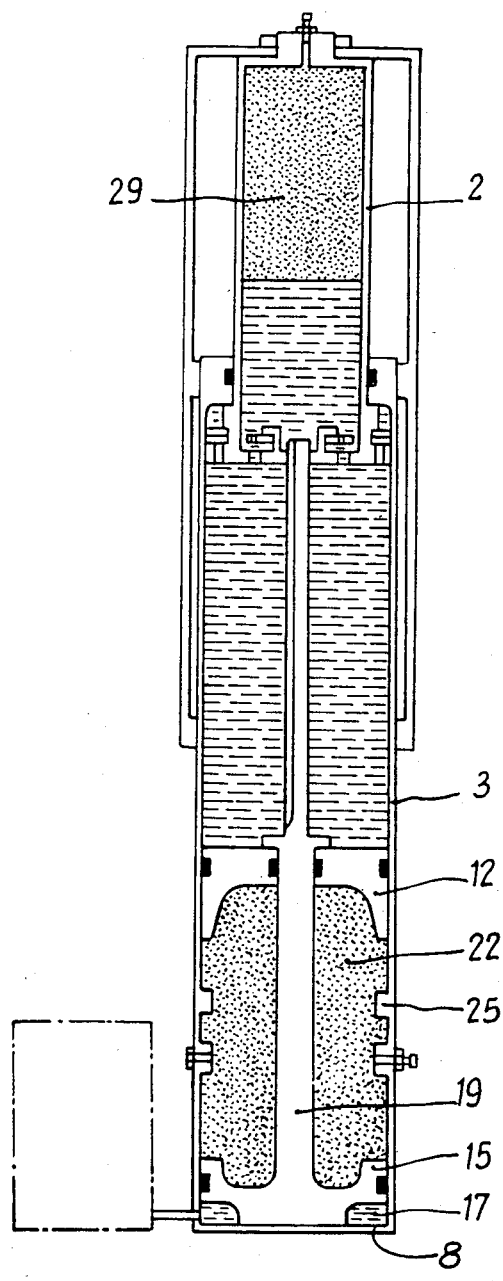

SHOCK ABSORBER WITH ADJUSTABLE RESIDUAL STROKE

The invention aims to provide a shock absorber, in particular for aircraft, where the shock absorber is of the type having two spring-forming chambers of compressible fluid, and having a residual stroke which can be increased by a considerable amount.

BACKGROUND OF THE INVENTION

Modern aircraft must be capable of running over, taking off from, and landing on grounds which are in poor condition and which have large bumps or ridges of non-negligible height. A shock absorber used under such conditions must enable such obstacles to be passed over with little effort and without any danger of bottoming.

It is initially recalled that a conventionally designed shock absorber has two internal functions: a resilient suspension function provided by compressing a volume of air; and an energy absorption function provided by forcing an incompressible fluid through a throttling orifice. In the description below, the term "shock absorber" is concerned solely with the resilient function.

A prior art shock absorber of the type having a single chamber of compressible air provides a resilient function as shown in FIG. 1 which is a plot showing the compression stroke C of the shock absorber as a function of the force F applied thereto. The force corresponding to the average static load Cs of the aircraft is located in the steeply sloping portion of the curve (high stiffness) in order to provide the aircraft with adequate stability. Further, in order to avoid aircraft bouncing on landing, the shock absorber must have a bottom threshold S.

As a result there is only a small margin of residual stroke d between the force under average static load Cs and the force Ft which corresponds to the shock absorber being pushed fully home.

There also exist prior art shock absorbers having two chambers of compressed air, and these are generally referred to as "two-chamber" shock absorbers. They provide a resilient function of the kind shown in FIG. 2. When the shock absorber is subjected to a force, it begins by compressing a so-called "low pressure" volume of air (curve A) up to a certain pressure threshold Fe. Thereafter, beyond this threshold, a so-called "high pressure" volume of air is compressed (curve B). The average static load Cs is located either on the stiff portion of the curve A for the abovementioned reasons, thereby enabling an increased amount of reserve stroke to be obtained for a given load force compared with a one-chamber shock absorber, or else on the low-slope portion of the curve B in order to reduce the forces and giving a reserve amount of stroke d". However, in particular in the second above-mentioned case, such an amount of reserve stroke is inadequate for passing over large-sized obstacles at high speed.

The main aim of the invention is therefore to provide a shock absorber having a resilient function which is suitable for passing over large-sized obstacles while nevertheless minimizing the forces generated by passing over such obstacles. Another aim of the invention is also to provide a shock absorber having a low threshold and high stiffness at the end of the retraction stroke in order to obtain good stability.

SUMMARY OF THE INVENTION

In order to achieve these aims, a preferred implementation of the invention and a variant thereof each have two operating configurations: the preferred mode has a single-chamber configuration and switches to a two-chamber configuration, while the variant switches from a first two-chamber configuration to a second two-chamber configuration.

More particularly, the present invention provides a shock absorber with adjustable residual stroke, the shock absorber comprising a rod slidable in a cylinder via a piston for determining at least two variable volume chambers, means for putting said chambers into communication with one another, one of the two chambers including first resilient means at a first pressure which is determined as a function of the load applied to the shock absorber, the other chamber including second resilient means at a second pressure determined as a function of the load applied to the shock absorber, and displacement means for displacing said second resilient means in translation, the shock absorber including the improvement whereby the second resilient means are suitable for being displaced without resilient deformation by said displacement means when the value of the second pressure is not less than the value of the first pressure, and whereby the second resilient means are suitable for being resiliently deformed by the load applied to the shock absorber when the value of the first pressure becomes equal to the value of the second pressure.

Advantageously, the second resilient means are located in one of the two chambers between a moving end plate and a raising piston both of which slide in sealed manner against the inside wall of the cylinder, the moving end plate and the raising piston being coupled unidirectionally by a rod having an abutment, said abutment limiting the relative separation between the raising piston and the moving end plate.

BRIEF DESCRIPTION OF THE DRAWINGS

Embodiments of the invention are described by way of example with reference to the accompanying drawings, in which:

FIG. 8 shows a varient shock absorber in accordance with the invention; and

MORE DETAILED DESCRIPTION

Figure 4:
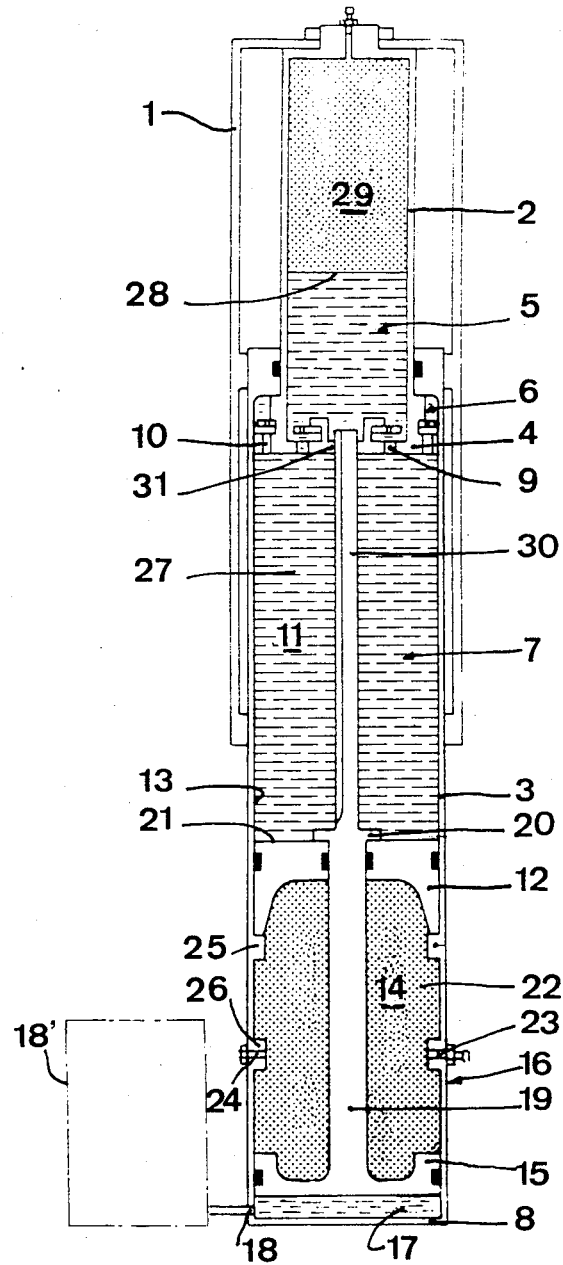
FIGS. 4, 5, 6, and 7 are diagrammatic longitudinal sections through an embodiment of a shock absorber in accordance with the invention and respectively in the following positions: "relaxed"; "under static load"; "raised under static load"; and "raised on running over a bump"
Figure 5:
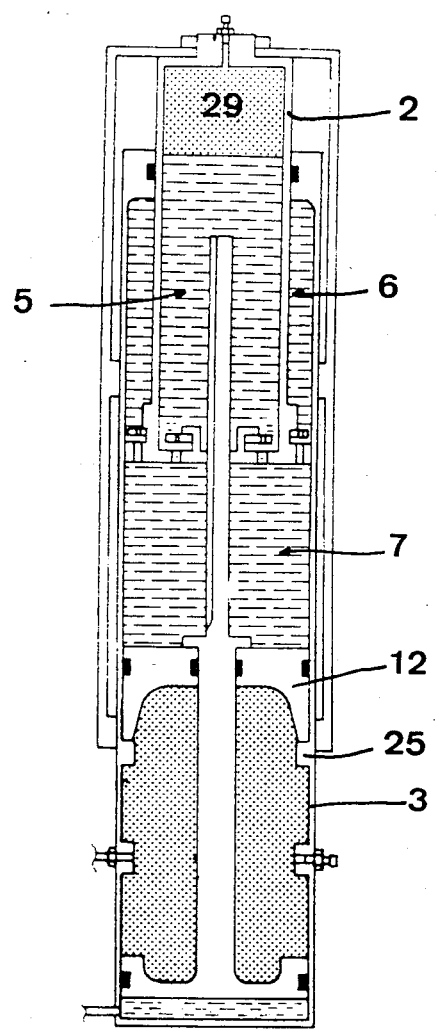
Figure 6:
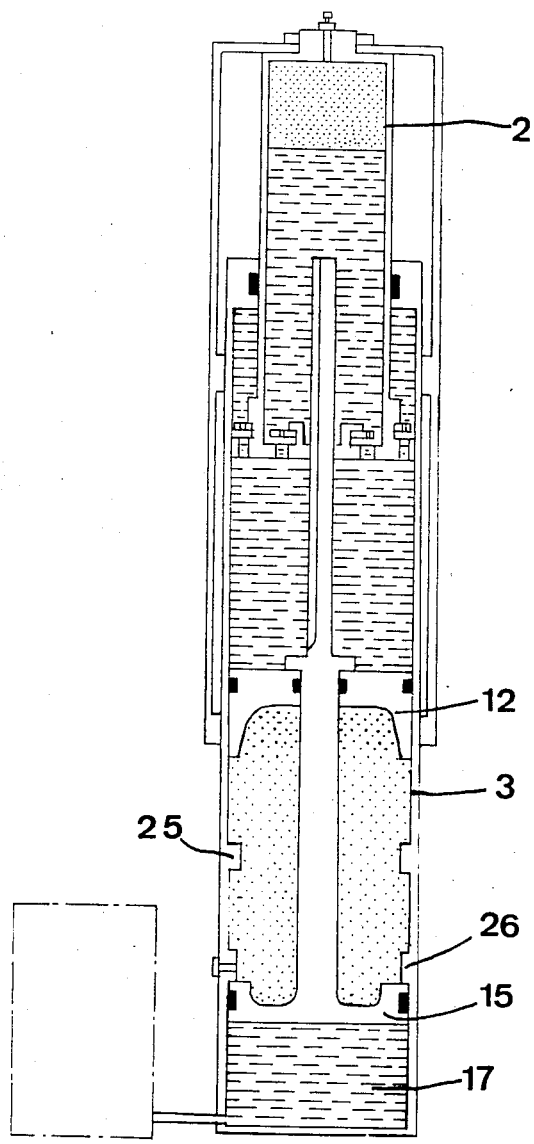
Figure 7:
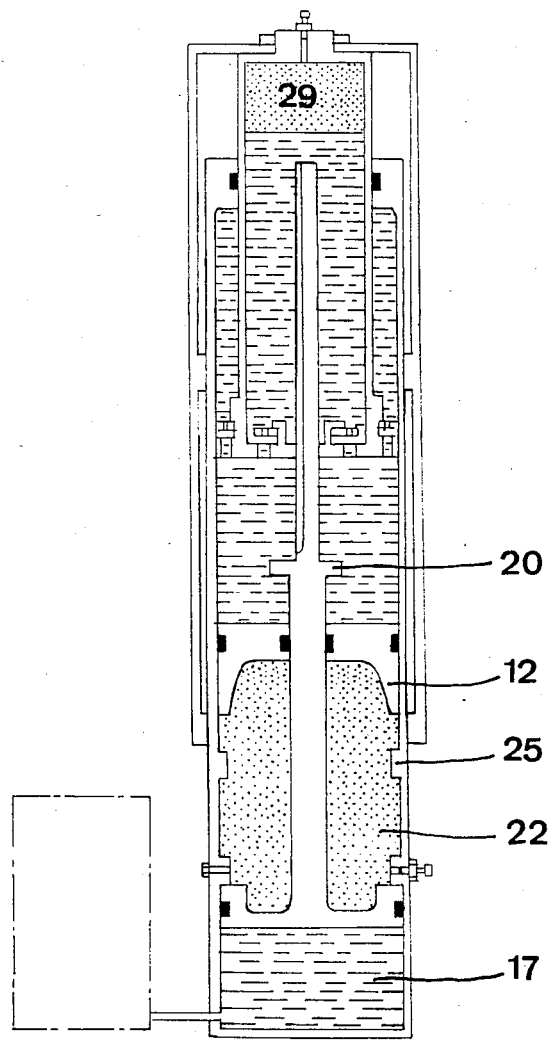

With reference to FIG. 4, a shock abosrber in accordance with the invention comprises a strut 1 inside which there is a rod 2 which is fixed to said strut and slidable in sealed manner inside a cylinder 3 by means of a piston 4. The piston defines at least two chambers, and in the present case it defines three chambers 5, 6, and 7. The chamber 5 is defined by the inside of the rod 2 up to the piston 4, the chamber 6 is defined between the rod 2 and the cylinder 3, and the chamber 7 is defined inside the cylinder 3 from the piston 4 up to the fixed end 8 of the cylinder 3. The piston 4 includes communication means 9 and 10 such as throttling means for interconnecting the chamber 5 and 7 and 6 and 7, respectively.

The chamber 7 is divided into three portions:

a portion 11 is defined between the piston 4 and a moving end plate 12 slidable in sealed manner against the inside wall 13 of the cylinder 3;

a second portion 14 delimited between the moving end plate 12 and a raising piston 15 which is slidable in sealed manner against the inside wall 13 of the cylinder 3 at its bottom end 16; and a third portion 17 extending between the raising piston 15 and the fixed end plate 8 of the cylinder 3 in order to constitute an actuator chamber capable of being fed with an incompressible fluid under high pressure via an orifice 18 provided through the fixed end 8, via a controllable source 18' shown in dot-dashed line.

The moving end plate 12 and the raising piston 15 are held apart in one direction only by a rod 19 for preventing these two items from moving further apart than a position defined by an abutment 20, constituted for example by a portion of the rod 19 coming into contact with the outside surface 21 of the moving end plate 12.

The second portion 14 between the moving end plate 12 and the raising piston 15 contains second resilient means 22 constituted by a large volume of compressible fluid at high pressure whose role is explained in greater detail below, said pressure causing the moving end plate 12 to come into contact with the abutment 20. The second portion 14 has an inflating valve 23 provided on a portion of the cylinder 3 and may be put into communication via an orifice 24 with an outside volume (not shown) contained, for example, in a gas cylinder for increasing the volume of the compressible fluid of said second portion 14.

The moving end plate 12 and the raising piston 15 have their displacements limited by at least one stop means, and in this case by two abutments 25 and 26 disposed between the moving end plate and the raising piston. These abutments 25 and 26 project inwardly from the inside wall of the cylinder 3 and serve as stop means for the moving end plate 12 and for the raising piston 15, respectively.

The chambers 5 and 6, and the first portion 11 between the piston 4 and the moving end plate 12 contain an incompressible fluid 27 such as oil up to a level, e.g. 28 in chamber 5, with a compressible fluid 29 such as a gas constituting the first resilient means being situated above the level 28.

The rod 19 is extended by a portion 30 to constitute a throttling needle in conventional manner and is suitable for passing through the piston 4 via an orifice 31.

The shock absorber in accordance with FIG. 3 and as shown in FIGS. 4 to 7 operates as follows. It is initially assumed that the second resilient means 22 are at a given pressure which is greater than the pressure of the first resilient means 29 when the shock absorber is in its "relaxed" position (FIG. 4). In this position, the moving end plate 12 is in contact with the abutment 25 and the actuator chamber 17 is at zero pressure.

Figure 1:
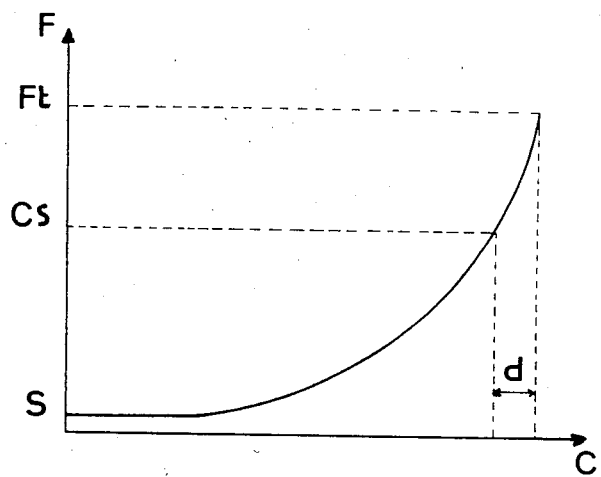
FIGS. 1 and 2 are respective graphs showing the force to be absorbed as a function of the retraction stroke of a prior art single chamber shock absorber and a prior art two-chamber shock absorber, as mentioned above.
Figure 2:
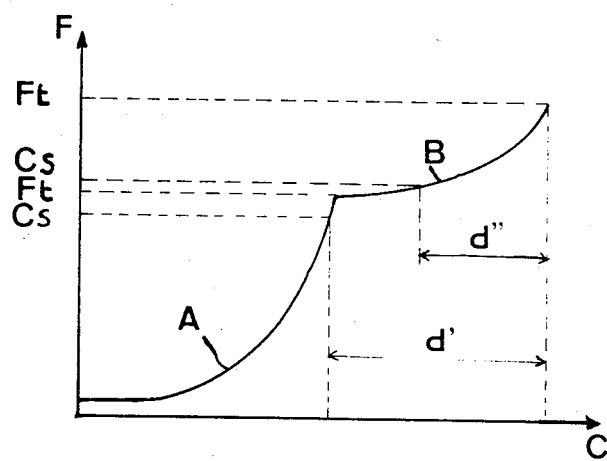

If the rod 2 moves into the shock absorber under the action of a force on the cylinder 3 (shock absorber under an average static load Cs—FIG. 5), the first resilient means 29 are compressed and oil then passes from the chamber 7 towards the chambers 5 and 6. During this operation the moving end plate 12 remains in contact with the abutment 25 and the corresponding resilient function is shown in FIG. 1 or by the dot-dashed line E in FIG. 3.

When an aircraft equipped with a shock absorber in accordance with the invention takes off from a ground in poor state, the aircraft is lifted or raised by putting the actuator chamber 17 under pressure by means of an incompressible high pressure fluid. The raising piston 15 and the moving end plate 12 are moved together in translation through a distance R defined by the raising piston coming into abutment against the stop means 26 (FIG. 6), thereby extending the cylinder 3 relative to the rod 2. (The moving end plate 12 is no longer in contact with the abutment 25).

Figure 3:
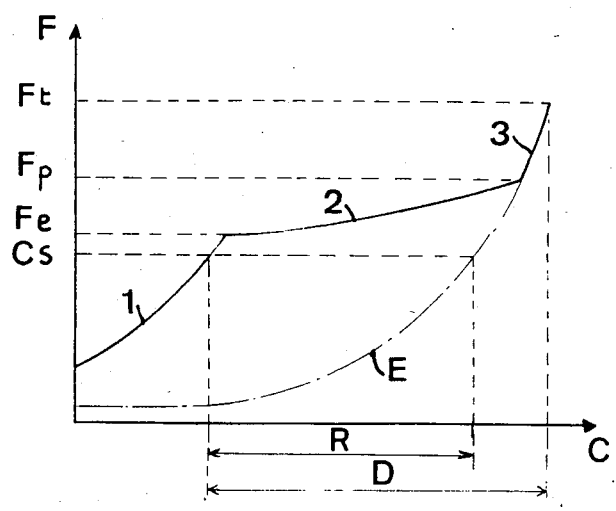
FIG. 3 is a graph of the force to be absorbed as a function of the retraction stroke for explaining the operation and the advantages of a shock absorber in accordance with the invention.

The resilient function as shown in dot-dashed line E on FIG. 3 is thus offset through a distance R corresponding to the distance through which the aircraft is raised and becomes curve 1.

Further, the average static load Cs has a value which is substantially less than the retraction threshold Fe of the second resilient means 22. As a result, when the shock absorber is subjected to a force, due in particular to passing over an obstacle, and greater than the retraction threshold Fe of the second resilient means 22, the moving end plate 12 moves and compresses the second resilient means (FIG. 7) (the moving end plate 12 is no longer in contact with the abutment 20); the corresponding resilient function is curve 2 in FIG. 3. These second high pressure resilient means are preferably of low stiffness, i.e. of large volume in order to minimize the forces generated by passing over obstacles.

When the force reaches a given value Fp, the moving end plate comes into abutment against the stop means 25 and the shock absorber operates by compression of the first resilient means 29. The resilient function during this stage is curve 3 and corresponds to the compression characteristic of the first resilient means 22 as shown in dot-dashed lines E on FIG. 3. The residual stroke D of the shock absorber is thus considerably increased. A shock absorber in accordance with the invention thus has a resilient operating characteristic having three zones corresponding to:

the stiff slope curve 1 obtained solely by compressing the first resilient means;

the long stroke and very low slope curve 2 for absorbing large bumps with reduced force, obtained above all by compression of the second resilient means having a retraction threshold Fe which is substantially greater than the average static load Cs; and the stiff sloped curve 3 obtained solely by compressing the first resilient means.

This highly characteristic curve shape solves the conflict between aircraft stability when running on the ground and suspension flexibility. The steep slope zones corresponding to curves 1 and 3 ensure stability while the low slope zone corresponding to stroke 2 provides flexibility.

FIG. 8 shows a variant of the above-described shock absorber for changing from one two-chamber configuration to another two-chamber configuration. In this variant, the shock absorber adapts as a function of the load applied thereto.

In the relaxed position of the shock absorber, the raising piston 15 is in contact with the end plate 8 of the cylinder 3 and the moving plate 12 is no longer in abutment against the stop means 25. Consequently, when the aircraft is under a static load, the first resilient means 29 are compressed. When the pressure of the first resilient means 29 reaches the retraction threshold Fe of the second resilient means 22, the moving end plate 12 moves and compresses the second resilient means 22.

Figure 9:
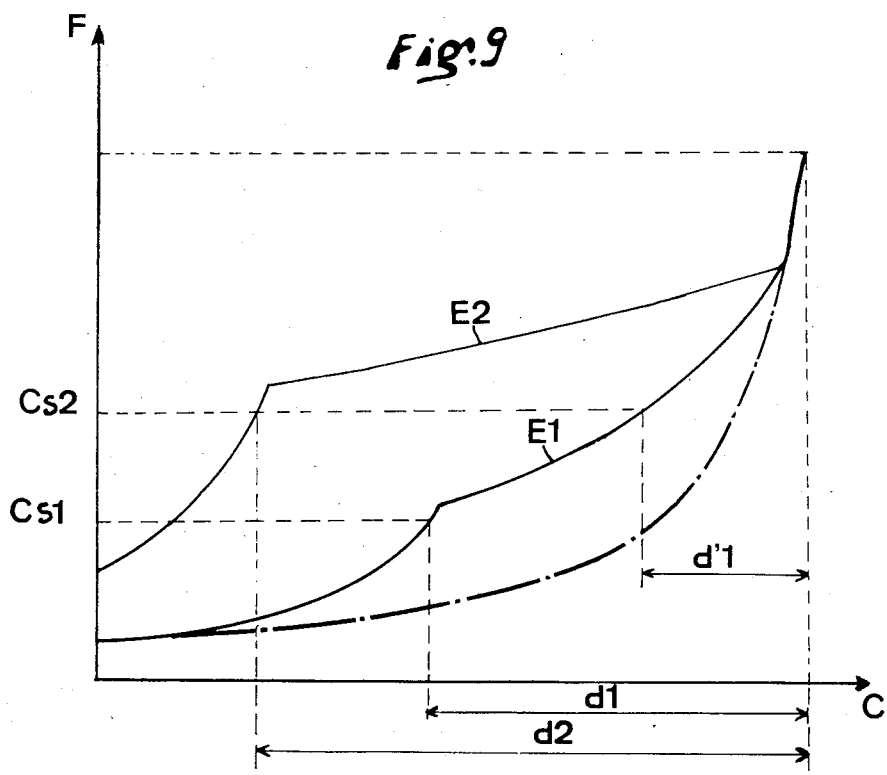
FIG. 9 is a graph showing the resilient function corresponding to a variant shock absorber.

When the force in the shock absorber becomes large, the moving end plate 12 comes into abutment with the stop means 25, and once again only the first resilient means 29 are compressed. The resilient function of this variant corresponding to one two-chamber configuration is thus curve E1 having three zones as shown in FIG. 9.

For an average static load Cs1 placed on the stiff slope of the first zone of the curve E1, the corresponding reserve stroke is d1. However, if the average static load becomes greater in order to reach a value Sc2, in particular during aircraft takeoff, the corresponding reserve stroke d'1 is too small for absorbing large bumps. In this case, by displacing the second resilient means 22 as already explained by feeding the actuator chamber 17 with an incompressible fluid, the shock absorber passes to another two-chamber configuration such as that represented by curve E2. The increased reserve stroke d2 is sufficient for absorbing even very high bumps. It should be observed that the shock absorber may be used either in a position such as shown in FIGS. 4 to 8, i.e. with the first resilient means disposed in the top portion of the shock absorber and the second resilient means disposed in the bottom portion, or else in an upside-down position. The upside-down position requires a separator piston to be interposed between the first resilient means 29 and the incompressible fluid 27, and considerably facilitates locating the controllable source for feeding the actuator chamber 17 which is then located in the top of the shock absorber.

We claim:

1. A shock absorber comprising a hollow rod slidable in a cylinder via a piston determining at least two variable volume chambers in communication with one another by means of apertures through said piston, one of said chambers being divided into three portions by a moving end plate and a raising piston slidably but sealingly mounted within said cylinder, a compressible fluid at a first pressure being disposed in one chamber in communication with a first one of said portions, a compressible fluid at a second pressure being disposed in a second of said portions between said moving end plate and said raising piston, and means for introducing incompressible fluid within a third of said portions on a side of said raising piston opposite said second compressible fluid, said moving end plate and said raising piston being connected by linking means comprising a rod attached to one of said end plate and said raising piston, said rod extending through said second compressible fluid and through a respective one of said raising piston and said end plate, and abutment means mounted on said rod so that said end plate and said raising piston can move toward each other but are prevented from moving a farther apart than a predetermined position.

2. A shock absorber according to claim 1 wherein at least one stop means constituted by a portion of the inside wall is disposed between the moving end plate and the raising piston.

* * * * *